US011463908B2

(12) United States Patent
Sun et al.

(10) Patent No.: US 11,463,908 B2
(45) **Date of Patent: *Oct. 4, 2022**

(54) SYSTEMS AND METHODS FOR TRANSMITTING A PREAMBLE WITHIN A WIRELESS LOCAL AREA NETWORK (WLAN)

(71) Applicant: NXP USA, INC., Austin, TX (US)

(72) Inventors: Yakun Sun, San Jose, CA (US); Hongyuan Zhang, Fremont, CA (US); Sudhir Srinivasa, Los Gatos, CA (US); Xiayu Zheng, San Jose, CA (US)

(73) Assignee: NXP USA, INC., Austin, TX (US)

( * ) Notice: Subject to any disclaimer, the term of this patent is extended or adjusted under 35 U.S.C. 154(b) by 102 days.

This patent is subject to a terminal disclaimer.

(21) Appl. No.: 16/939,813

(22) Filed: Jul. 27, 2020

(65) Prior Publication Data

US 2020/0367102 A1 Nov. 19, 2020

Related U.S. Application Data

(63) Continuation of application No. 16/126,344, filed on Sep. 10, 2018, now Pat. No. 10,728,798, which is a (Continued)

(51) Int. Cl.
*H04W 28/06* (2009.01)
*H04L 25/02* (2006.01)
(Continued)

(52) U.S. Cl.
CPC .............. *H04W 28/06* (2013.01); *H04B 7/04* (2013.01); *H04B 7/0617* (2013.01); (Continued)

(58) Field of Classification Search
CPC ........ H04W 28/06; H04W 84/12; H04B 7/04; H04B 7/0617; H04L 25/0242; H04L 27/2602; H04L 27/2626; H04L 27/2646
See application file for complete search history.

(56) References Cited

U.S. PATENT DOCUMENTS

2011/0305194 A1* 12/2011 Zheng .................. H04W 52/42 370/328
2013/0182593 A1* 7/2013 Zhang .................. H04L 5/0023 370/252
2014/0307612 A1 10/2014 Vermani et al.

* cited by examiner

*Primary Examiner* — Duc C Ho

(57) ABSTRACT

Some embodiments described herein provide a method for transmitting a preamble in accordance with a wireless local area network communication protocol. In some embodiments, a data frame may be obtained for transmission including a preamble compliant with the wireless local area network communication protocol. It may be determined that the preamble includes a first preamble portion that spans multiple symbol durations and a second preamble portion that spans a single symbol duration. The first preamble portion via beamforming may be transmitted based on a first beamforming matrix. When a transmission mode of the second preamble portion is beamforming, a second beamforming matrix may be generated based on the first beamforming matrix, each tone for the second preamble portion may be calculated based on the second beamforming matrix. Each calculated tone may be transmitted in accordance with the wireless local area network communication protocol.

20 Claims, 6 Drawing Sheets

Related U.S. Application Data continuation of application No. 15/262,485, filed on Sep. 12, 2016, now Pat. No. 10,075,874.

(60) Provisional application No. 62/246,316, filed on Oct. 26, 2015, provisional application No. 62/216,550, filed on Sep. 10, 2015.

(51) Int. Cl.

| | |
|---|---|
| ***H04L 27/26*** | (2006.01) |
| ***H04B 7/06*** | (2006.01) |
| ***H04B 7/04*** | (2017.01) |
| *H04W 84/12* | (2009.01) |

(52) U.S. Cl.

CPC ...... *H04L 25/0242* (2013.01); *H04L 27/2602* (2013.01); *H04L 27/2626* (2013.01); *H04L 27/2646* (2013.01); *H04W 84/12* (2013.01)

SYSTEMS AND METHODS FOR TRANSMITTING A PREAMBLE WITHIN A WIRELESS LOCAL AREA NETWORK (WLAN)

CROSS-REFERENCE TO RELATED APPLICATIONS

This application is a continuation application of U.S. patent application entitled "SYSTEMS AND METHODS FOR TRANSMITTING A PREAMBLE WITHIN A WIRELESS LOCAL AREA NETWORK (WLAN)", having a Ser. No. 16/126,344, having a filing date of Sep. 10, 2018; which is a continuation application of U.S. patent application entitled "SYSTEMS AND METHODS FOR TRANSMITTING A PREAMBLE WITHIN A WIRELESS LOCAL AREA NETWORK (WLAN)", having a Ser. No. 15/262,485, having a filing date of Sep. 12, 2016, which claims the benefit of U.S. provisional application entitled "11Ax 1× PREAMBLE", having a Ser. No. 62/246,316, and having a filling date of Oct. 26, 2015, and which also claims the benefit of U.S. provisional application entitled "11Ax 1× PREAMBLE", having a Ser. No. 62/216,550, and having a filling date of Sep. 10, 2015, having common inventors, and having a common assignee, all of which is incorporated by reference in its entirety.

FIELD OF USE

This disclosure relates to a preamble transmission mechanism in a wireless data transmission system; for example, a wireless local area network (WLAN) implementing the IEEE 802.11 standard, which can be used to provide wireless transfer of data in outdoor deployments, outdoor-to-indoor communications, and device-to-device (P2P) networks.

BACKGROUND OF THE DISCLOSURE

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

Wireless local area networks (WLANs) operate under WLAN standards such as the Institute for Electrical and Electronics Engineers (IEEE) 802.11a, 802.11b, 802.11g, and 802.11n Standards. The 802.11 standards may specify transmission protocols and data frame formats for data packets. For example, the 802.11 standards may adopt a physical layer convergence procedure (PLCP), under which the PLCP protocol data unit (PPDU) format is used for preamble. The existing 802.11 PPDU in 2.4/5 GHz has a mixed format structure, which includes legacy 802.11a/g portion of preambles and other format portions of preambles suitable for more recently developed 802.11 standards. Such a mixed format preamble is effective in backward compatibility and performance. Thus, because of the mixed structure, a transmission mechanism for the preamble is needed to adapt to both the legacy portion and the non-legacy portion, which can be compatible with the more recently developed 802.11 standards.

SUMMARY

Some embodiments described herein provide a method for transmitting a preamble in accordance with a wireless local area network communication protocol. In some embodiments, a data frame may be obtained for transmission including a preamble compliant with the wireless local area network communication protocol. It may be determined that the preamble includes a first preamble portion that spans multiple symbol durations and a second preamble portion that spans a single symbol duration. The first preamble portion via beamforming may be transmitted based on a first beamforming matrix. When a transmission mode of the second preamble portion is beamforming, a second beamforming matrix may be generated based on the first beamforming matrix, each tone for the second preamble portion may be calculated based on the second beamforming matrix. Each calculated tone may be transmitted in accordance with the wireless local area network communication protocol.

In some implementations, the first preamble portion includes a high efficiency short training field (HESTF), and a high efficiency long training field (HELTF), and the second preamble portion includes legacy training fields and signaling configuration fields.

In some implementations, when the transmission mode of the second preamble portion is omni-directional, the second preamble portion may be transmitted in omni-direction with no data transmission on guard tones that are configured in accordance with the wireless local area network communication protocol.

In some implementations, channel estimation may be performed using a first training field contained in the first preamble portion even if channel estimation has been performed based on a second training field contained in the second preamble portion.

In some implementations, guard tones may be filled in accordance with the wireless local area network communication protocol with extended symbols.

In some implementations, the extended symbols are known symbols for a receiver to perform channel estimation.

In some implementations, at least one of cyclic delay diversity (CDD) and cyclic shift diversity (CSD) may be applied to the preamble.

In some implementations, when the CSD is applied in time domain to the second preamble portion, the same CSD is applied in time domain to the first preamble portion.

In some implementations, when the CDD is applied in frequency domain to the second preamble portion, the same or a different CDD is applied in frequency domain to the first preamble portion.

In some implementations, the second preamble portion may be transmitted via a mixed transmission mode of beamforming and omni-direction, wherein the mixed transmission mode is specified via a data value transmitted with the preamble, or implied by a transmission characteristic of the second preamble portion.

Some embodiments described herein provide a system for transmitting a preamble in accordance with a wireless local area network communication protocol. The system includes processing circuitry that is configured to obtain a data frame for transmission including a preamble compliant with the wireless local area network communication protocol, and determine that the preamble includes a first preamble portion that spans multiple symbol durations and a second preamble portion that spans a single symbol duration. The system further includes a network interface that is configured to transmit the first preamble portion via beamforming based on a first beamforming matrix. When a transmission mode of the second preamble portion is beamforming, the processing circuitry is configured to generate a second beamforming matrix based on the first beamforming matrix, and calculate each tone for the second preamble portion based on the second beamforming matrix. The network interface is configured to transmit each calculated tone under the wireless local area network communication protocol.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

This disclosure describes methods and systems for transmitting a preamble within an 802.11 wireless network. In some embodiments, the PPDU under 802.11ax may include two different portions of preamble, e.g., a 1× symbol duration portion of preamble and a 4× symbol duration portion of preamble. While the 4× symbol duration portion of preamble is usually transmitted using beamforming, the 1× symbol duration portion of preamble may also be transmitted via beamforming, instead of the omni-directional transmission under 802.11ac. In this way, the power configuration of transmitting the two portions of the preamble of the same PPDU may remain the same and thus do not require re-configuration. In addition, when the 1× symbol duration portion of preamble is transmitted via beamforming, data fields in both the 1× symbol duration portion of preamble and the 4× symbol duration portion of preamble can be used for channel estimation. Also, extended symbols may be filled on the 802.11a guard tones, which can be used to enhance channel estimation at the receiver. Thus, channel performance of the PPDU transmission may be improved.

Figure 1:
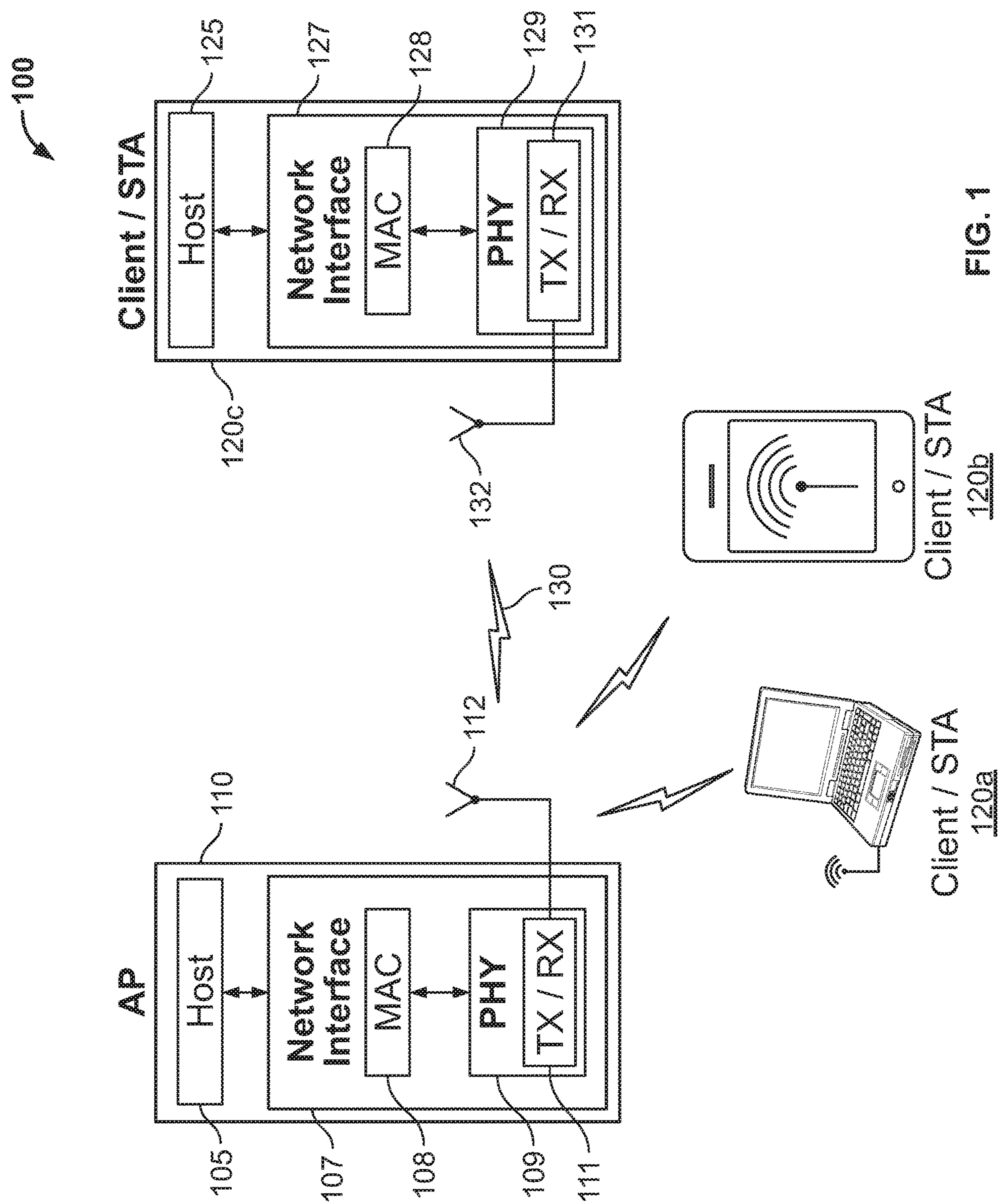
FIG. 1 is a block diagram of an example wireless WLAN 100 that the preamble transmission mechanism can be operated within, according to some embodiments described herein.

FIG. 1 is a block diagram of an example wireless WLAN 100 that the preamble transmission mechanism can be operated within, according to some embodiments described herein. A wireless access point 110 (AP) includes a host processor 105 that may be configured to process or assist in data operation, such as modulation/demodulation, encoding/decoding, encryption/decryption, and/or the like. For example, the host processor 105 may be configured to configure and/or process the data frames illustrated in FIGS. 2-3, and/or perform the work flows illustrated in FIGS. 4 and 6.

A network interface device 107 is coupled to the host processor 105, which is configured to interface with an outer network. The network interface device 107 includes a medium access control (MAC) processing unit 108 and a physical layer (PHY) processing unit 109. The PHY processing unit 109 includes a plurality of transceivers 111, and the transceivers 111 are coupled to a plurality of antennas 112.

The WLAN 100 includes a plurality of client stations 120*a-c*. Although three client stations 120*a-c* are illustrated in FIG. 1, the WLAN 100 can include different numbers (e.g., 1, 2, 3, 5, 6, etc.) of client stations 120*a-c* in various scenarios and embodiments. Each client station, e.g., 120*a-c*, may have a similar structure as that of an AP 110. For example, the client station 120*c* can include a host processor 125 coupled to a network interface device 127. The network interface device 127 includes a MAC processing unit 128 and a PHY processing unit 129. The PHY processing unit 129 includes a plurality of transceivers 131, and the transceivers 131 are coupled to a plurality of antennas 132 to receive or transmit data from or to the wireless communication channel.

Two or more of the client stations 120*a-c* may be configured to receive data such as including an 802.11 PPDU 130, which may be transmitted simultaneously by the AP 110. Additionally, two or more of the client stations 120*a-c* can be configured to transmit data to the AP 110 such that the AP 110 receives the data. An example data structure of a preamble under 802.11ac is illustrated in FIG. 2.

Figure 2:
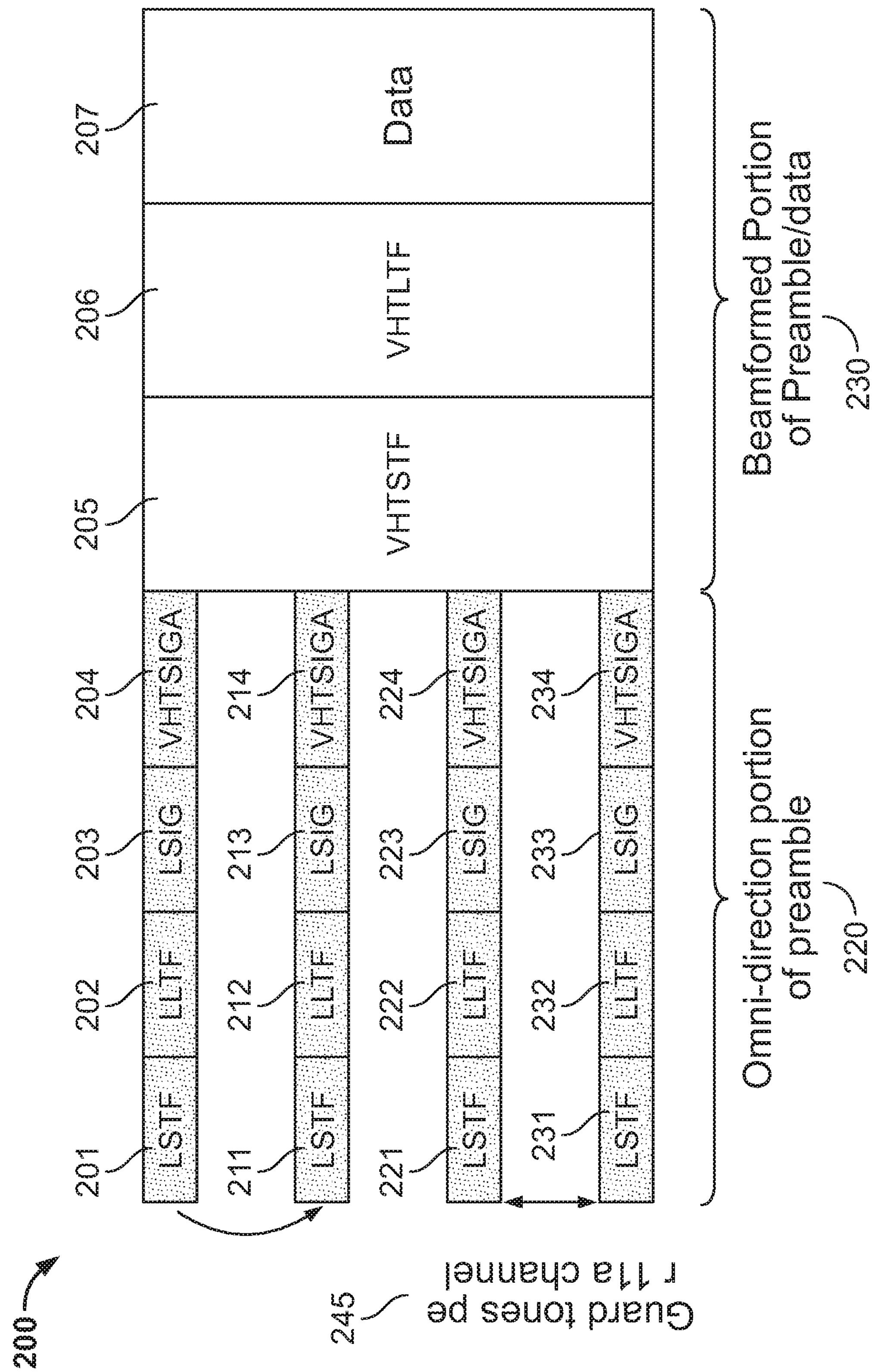
FIG. 2 provides an example block diagram illustrating an example of data transmission scheme 200 for a preamble under 802.11ac, according to some embodiments described herein.

FIG. 2 provides an example block diagram illustrating an example data transmission scheme 200 for a preamble under 802.11ac, according to some embodiments described herein. The legacy portion of the preamble may include a legacy short training field (LSTF 201), a legacy long training field (LLTF 202), a legacy signal field (LSIG 203), and a very high throughput (VHT) signal field A (SIGA), which may be transmitted in omni-direction at 220. In another example, the non-legacy preamble, e.g., a preamble developed for the later version of the 802.11 standards, the VHT short training field (VHTSTF 205) and VHT long training field (VHTLTF 206), together with the payload data 207, may be transmitted via beamforming, at 230.

Thus, the legacy portion and part of the non-legacy preamble may be transmitted in an 802.11a tone plan. For example, some of preamble fields (e.g., fields 201-204) are duplicated (e.g., see duplicated fields 211-214, 221-224 and 231-234, which are the duplicates of fields 201-204) over each 802.11a 20 MHz channel when the bandwidth is greater than 20 MHz. The transmission of the duplicated copies may be separated by guard tones 245 per each 802.11a 20 MHz channel.

Due to the different transmission schemes for the omni-directional preamble 220 and beamformed preamble 230, additional configuration of transmission parameters may need to be performed. For example, an LSTF-based automatic gain control (AGC) may need to be reset when the transmission scheme switches from omni-directional to beamforming. For another example, the LLTF-based channel estimates obtained during omni-directional transmission may not be for the payload data transmission because the payload data 207 is transmitted via beamforming. Thus, the omni-directional preamble 220 may not be useful in the beamformed portion 230.

Figure 3:
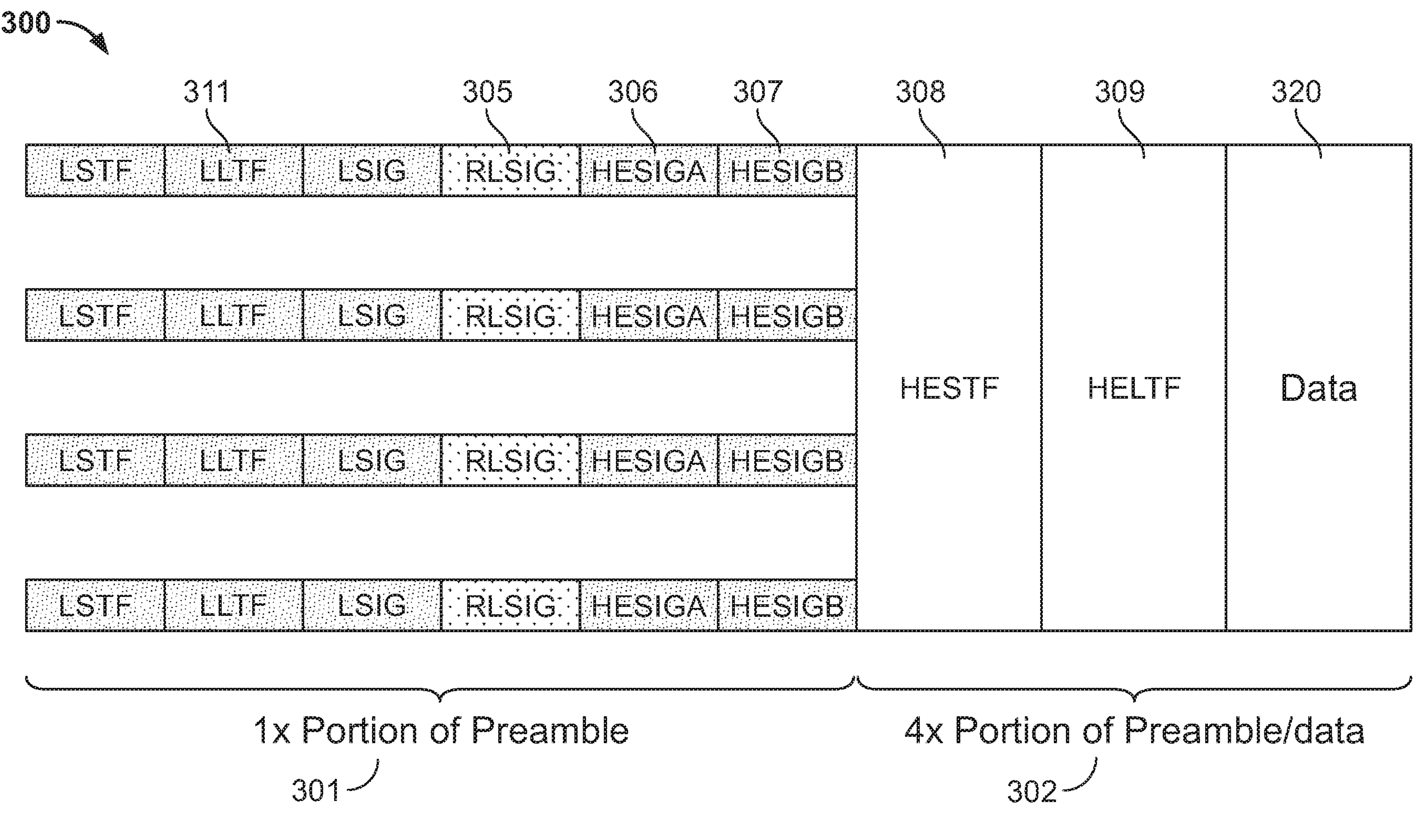
FIG. 3 provides an example block diagram illustrating an example of data transmission scheme 200 for a preamble frame structure under 802.11ax, according to some embodiments described herein.

FIG. 3 provides an example block diagram illustrating an example data transmission scheme 200 for a preamble frame structure under 802.11ax, according to some embodiments described herein. The 802.11ax PPDU includes a 1× symbol duration portion of preamble 301 (tone spacing=312.5 KHz), and a 4× symbol duration portion of preamble and data 302 (tone spacing=312.5/4 KHz). The 1× symbol duration portion of preamble 301 includes, in addition to the LSTF, LLTF and LSIG fields, a repeated LSIG (RLSIG 305), a high efficiency signal field A 306 (SIGA) and an HE signal field B 307 (HE-SIGB). Specifically, the HESIGB is used to signal the resource unit signaling and physical layer (PHY) configuration for data transmission; and the HESIGA 306 provides channel-SIGB mapping information, e.g., the information of which channels is carried by the HESIGB. Thus, the 1× symbol duration portion of preamble 301 is to be transmitted in a way that the 1× symbol duration portion of preamble 301 can be useful during the transmission of the 4× symbol duration portion of preamble and data 302.

Figure 4:
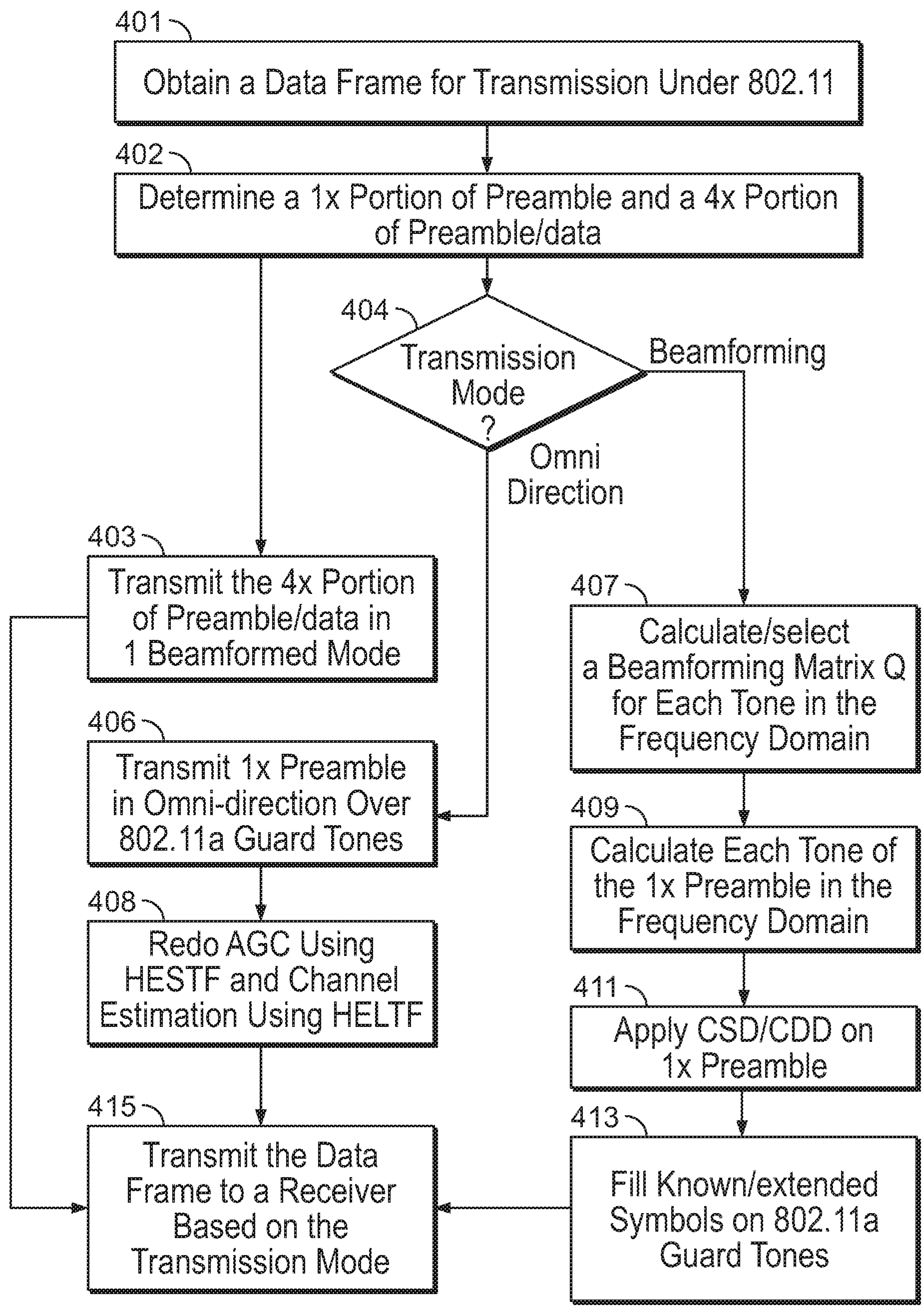
FIG. 4 provides an example logic flow diagram illustrating aspects of transmitting the 1× symbol duration portion of preamble 301 and the 4× symbol duration portion of preamble/data 302, according to some embodiments described herein.

FIG. 4 provides an example logic flow diagram illustrating aspects of transmitting the 1× symbol duration portion of preamble 301 and the 4× symbol duration portion of preamble/data 302, according to some embodiments described herein. At 401, a wireless transmitter (e.g., an 802.11 transmitter) may obtain a data frame for transmission. For example, the data frame may be but is not limited to the 802.11ax preamble in FIG. 3. At 402, the transmitter may determine the 1× symbol duration portion of preamble (e.g., portion 301) and the 4× symbol duration portion of preamble/data (e.g., portion 302). At 403, the 4× symbol duration portion of preamble/data may be transmitted via beamforming.

At 404, the transmission mode for the 1× symbol duration portion of preamble may be determined, e.g., based on a pre-defined configuration of the data frame. In one implementation, at 406, the 1× symbol duration portion of preamble 301 may be transmitted in omni-direction over 802.11a tones, in a similar manner as the omni-directional portion of preamble 220 under 802.11ac in FIG. 2. In this way, the data transmission may be operated in a similar manner as that in an 802.11n/ac system, except that AGC may be redone using a high efficiency short training field (HESTF 308), and channel estimation may be restarted using a high efficiency long training field (HELTF 309).

In another implementation, the 1× symbol duration portion of preamble 301 may also be beamformed with one spatial stream. For example, at 407, the beamforming matrix Q can be designed based on the 4× symbol duration portion of preamble and data 302 on the frequency domain. When multiple transmitting antennas are deployed, time domain cyclic delay diversity (CDD) may be used for antenna mapping in the frequency domain. Specifically, the $j^{th}$ column of the training matrix A for HELTF may be used to map a single stream to the number of spatial streams of the beamforming matrix Q, in which j can be any available column, e.g., j=1, 3, 5, . . . .

At 409, the $k^{th}$ tone of the 1× symbol duration portion of preamble 301 in the frequency domain may be calculated as:

$$x_{field,k}^{(i_{TX})} = \sum_{m=1}^{N_{sts,k}} [Q_k]_{i_{TX},m} \; [A_{field}^{k}]_{m,1} \; s_{field,k} \; \exp(-j2\pi k\Delta_F T_{CS,HE}(m))$$

where $x_{field,k}^{(i_{TX})}$ denotes the $k^{th}$ tone of the 1× symbol duration portion of preamble 301 at the $i^{th}$ transmitting antenna; $N_{sts,k}$ denotes the number of space-time streams at the $k^{th}$ tone; $Q_k$ denotes the beamforming matrix on the $k^{th}$ tone and $[Q_k]_{i_{TX},m}$ denotes the entry on the $i_{TX}$-th row and m-th column; $A_{field}^{k}$ denotes the training matrix for HELTF on the $k^{th}$ tone and $[A_{field}^{k}]_{m,1}$ denotes the entry on the m-th row and first column; $s_{field,k}$ denotes the data symbol being transmitted on the $k^{th}$ tone; and $\Delta_F T_{CS,HE}(m)$ denotes the delay diversity factor that adds a linear phase on the $k^{th}$ tone.

Specifically, back to 407, the beamforming matrix $Q_k$ on the $k^{th}$ tone of the 1× symbol duration portion of preamble 301 may be calculated per each Q matrix for the 4× symbol duration portion of preamble and data 302. The calculation may be written as:

$$Q_{k,1\times}=f(Q_{k,4\times}, k=-N_{SR}, \ldots, N_{SR})$$

where $N_{SR}$ denotes the number of tones. For example, the beamforming matrix Q on the $k^{th}$ tone of the 1× symbol duration portion of preamble 301 may be the same as the beamforming matrix of the 4 k-th tone on the 4× symbol duration portion of preamble and data 302, e.g., $$Q_{k,1\times}=Q_{4k,4\times}$$

In another example, the beamforming matrix $Q_k$ on the $k^{th}$ tone of the 1× symbol duration portion of preamble 301 may be the beamforming matrix of non-empty tone closest in frequency on the 4× symbol duration portion of preamble and data 302. Or alternatively, the beamforming matrix $Q_k$ on the $k^{th}$ tone of the 1× symbol duration portion of preamble 301 may be the interpolation of the beamforming matrices on the tones around the frequency for the 4× symbol duration portion of preamble and data 302.

In a different example, the beamforming matrix Q on the $k^{th}$ tone of the 1× symbol duration portion of preamble 301 may be calculated per each Q matrix for a 4× symbol duration portion of preamble and data. In this way, the beamforming matrix $Q_k$ on the $k^{th}$ tone of the 1× symbol duration portion of preamble 301 is the same as that of the $k^{h}$ tone of the 4× symbol duration portion of preamble and data.

In one implementation, at 411, when multiple transmitting antennas are deployed, cyclic delay diversity (CDD) or cyclic shift diversity (CSD) may be applied on the frequency domain per stream. Or alternatively, CDD or CSD may be applied on the time domain per antenna. Or alternatively, a combination of both frequency-domain and time-domain CDD/CSD may be applied.

If time-domain CSD is applied on LLTF (e.g., see field 202 in FIG. 2 or field 311 in FIG. 3), the same time-domain CSD is also applied on any HTLTF (high throughput LTF, not shown in the figures), VHTLTF (e.g., see field 206 in FIG. 2), HELTF (e.g., see field 309 in FIG. 3) and the data field (e.g., see field 320 in FIG. 3). Conversely, if time-domain CSD is not applied on LLTF, then time-domain CSD is not applied on any of the HTLTF/VHTLTF/HELTF/data fields either.

However, frequency-domain CSD allows more flexibility. If frequency-domain CSD is applied on LLTF (e.g., see field 202 in FIG. 2 or field 311 in FIG. 3), the same, another different or no frequency-domain CSD is also applied on HTLTF/VHTLTF/HELTF, and the same or the other different or no frequency-domain CSD can be applied on the data field. If frequency-domain CSD is not applied on LLTF, a frequency-domain CSD may or may not be applied on HTLTF/VHTLTF/HELTF, and a same or different frequency-domain CSD may also be applied on the data field.

The 1× symbol duration portion of a preamble may be defined per their respective purposes on each 802.11a data tone. For example, the 1× symbol duration portion of preambles may be duplicated over each 20 MHz channel for legacy preamble, RLSIG, and HESIGA, e.g., in a similar way as the omni-directional portion of preamble 220 is duplicated as shown in FIG. 2. The 1× symbol duration portion of preamble may be generated by HESIGB coding.

For example, the 1× symbol duration portion of preamble symbols on the 802.11a guard tones may be empty, e.g., in a similar way as shown in FIG. 2 where there is no transmission at the guard tones 245. In another example, at 413, the 1× symbol duration portion of preamble symbols on the 802.11a guard tones may be filled with known/extended symbols, which may be filled to cover the 4× tone plan.

Figure 5:
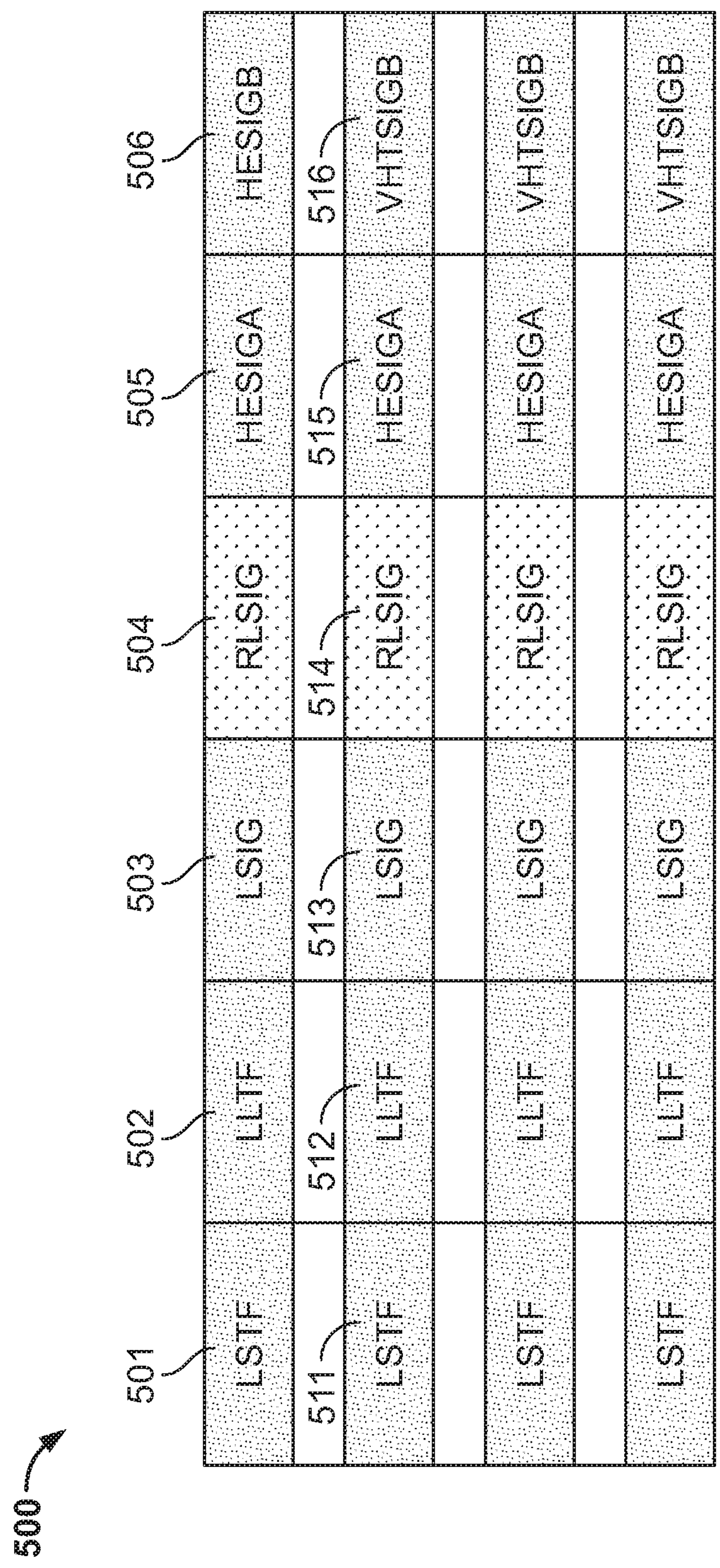
FIG. 5 provides an example block diagram illustrating a transmission scheme 500 for the 1× symbol duration portion of a preamble (e.g., see preamble 301 in FIG. 3), according to some embodiments described herein.

FIG. 5 provides an example block diagram illustrating a transmission scheme 500 for the 1× symbol duration portion of a preamble (e.g., see preamble 301 in FIG. 3), according to some embodiments described herein. As shown in FIG. 5, in the transmission scheme 500, the 1× symbol duration portion of preamble fields LSTF 501, LLTF 502, LSIG 503, RLSIG 504, HESIGA 505, and HESIGB 506, have extended 1× preamble symbols 511-516, respectively, to fill the 802.11a guard tones. The extended symbols 511 on LSTF may still follow the frequency density and maintain periodicity. The extended symbols 512 on LLTF may be used for channel estimation. Alternatively, the LSIG/RLSIG/HESIGA/HESIGB extended symbols 513-516 may be skipped. Power adjustment may be set on the 1× preambles as needed.

Back to FIG. 4, at 415, the 1× symbol duration portion of preamble and the 4× symbol duration portion of preamble/data from 403, 408 and 413, respectively, are transmitted to a receiver based on the transmission mode configured in 403, 408 and 413.

In one implementation, the transmission of the 1× symbol duration portion of preamble may use mixed modes of omni-directional transmission and beamforming transmission. For example, one PPDU may engage the omni-directional transmission, and the next PPDU may engage the beamforming transmission. In this case, the mode of 1× symbol duration portion of preamble may need to be signaled.

For implicit signaling, when the HESTF does not trigger an AGC change, then the beamforming mode is applied. Or in a different example, a detection on extended symbols indicates the beamformed mode.

In another implementation, the 1× preamble transmission mode may be implied by the frame format and/or other parameters. For example, single user (SU) and multi-user multiple-input multiple-output (MU-MIMO) frames may imply that a beamformed preamble is used, and an orthogonal frequency-division multiple access (OFDMA) frame may imply that an omni-directional preamble is used.

In another implementation, even when only a beamformed preamble is used, the receiver may treat the 1× preamble as omni-directional or beamformed based on a decision (e.g., based on the HESTF measurement).

On the other hand, a variety of explicit signaling may be used to indicate whether a 1× preamble is omni-directional or beamformed. For example, the HESIGA may be configured to contain a bit to signal "omni-directional" and "beamformed" preamble mode. Or a LSIG reserved bit, or LENGTH %3 may be used to signal the preamble mode. In another example, quadrature or binary phase shift keying (QBPSK) rotation may be used on a given 1× preamble symbol, e.g., HESIGA-1, HESIGA-2, or one of the two HESIGBs, to indicate whether the respective 1× preamble symbol is omni-directional or beamformed. In another example, a scrambling sequence on RLSIG may be used to indicate the transmission mode of the respective 1× preamble. In another example, an additional management or control frame can be used to indicate the transmission mode of the respective 1× preamble. It is noted that the implicit signaling and explicit signaling discussed above may be used independently, interchangeably, and/or jointly, when a mixed transmission mode is used to transmit 1× preambles.

In some implementations, the HESTF field (e.g., see HESTF 308 in FIG. 3) is transmitted without regard for the transmission mode of the 1× preamble mode. Or alternatively, the HESTF data field can be skipped when a beamformed 1× preamble is used. In this case, some new field can be transmitted in place of HESTF.

In some implementations, the HELTF field (e.g., see HELTF 309 in FIG. 3) is transmitted from the first column of the training matrix A. Or alternatively, the HELTF field may start to transmit with the $j^{th}$ column of the A matrix being skipped, when using a beamformed 1× preamble and the extended preamble symbols (e.g., as shown in FIG. 4). For example, if j=1, then the HELTF field starts from the $2^{nd}$ column of the A matrix.

Figure 6:
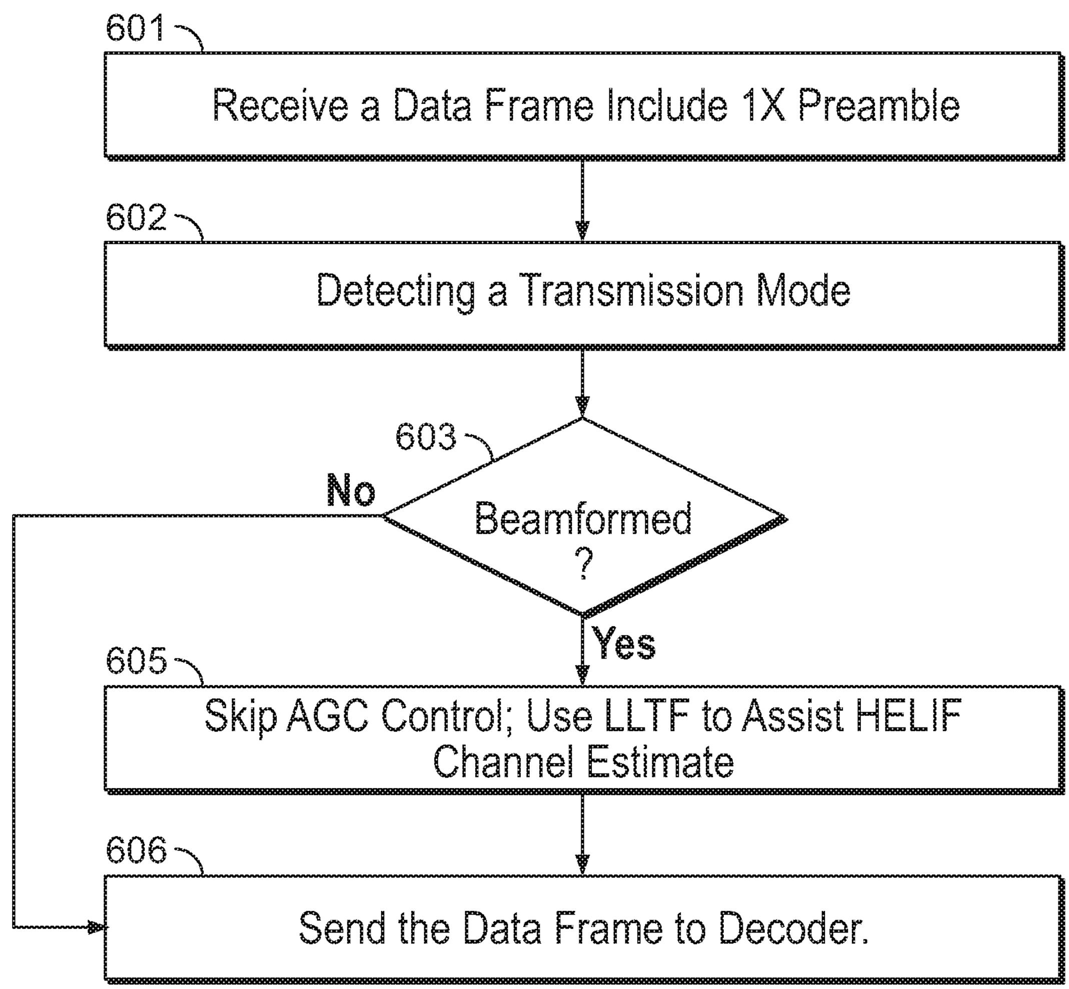
FIG. 6 provides an example logic flow diagram illustrating a receiver processing a received preamble, according to some embodiments described herein.

FIG. 6 provides an example logic flow diagram illustrating a receiver processing a received preamble, according to some embodiments described herein. In some implementations, at the receiver, when the 1× symbol duration portion of preamble is received at 601, the 1× symbol duration portion of preamble may be processed based on the transmission mode, which is detected at 602. For example, upon detecting a beamformed 1× preamble at 603, the receiver may skip AGC control directly at 605. Or alternatively, upon detecting beamformed 1× preamble, the receiver may use an LLTF (e.g., see LLTF 202 in FIG. 2 and LLTF 311 in FIG. 3) to assist an HELTF channel estimate at 605. For example, the received LLTF (e.g., field 311 in FIG. 3) and the received first symbol of HELTF (e.g., field 309 in FIG. 3) can be averaged or combined for noise suppression. The receiver may then send the data frame to decoder at 606, after the beamformed 1× symbol duration portion of preamble has been processed.

The data frame transmission scheme and signaling methods discussed in FIGS. 3-6, although the different modes for 1× preamble are discussed primarily for 802.11ax, can be extended to 802.11n/ac. For example, the implementations discussed in connection with any of the HE fields can also be applied on the corresponding HT/VHT field. The 11n/11ac omni-directional preamble can also be transmitted in beamformed mode. The preamble mode may also be signaled either implicitly or explicitly as described for 11ax. For example, all implicit signaling methods discussed in connection with 802.11ax can be applied for 11n/ac. Explicit signaling can be done by setting reserved bits in LSIG, HTSIG, VHTSIGA, or by setting certain fields to a specific value.

While this specification contains many specifics, these should not be construed as limitations on the scope of what may be claimed, but, rather, as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination.

While operations are depicted in the drawings in a particular order, this should not be understood as requiring that such operations be performed in the particular order shown or in sequential order, or that all illustrated operations be performed, to achieve the desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

Suitable computer program code residing on a computer-readable medium may be provided for performing one or more functions in relation to performing the processes as described herein. The term "computer-readable medium" as used herein refers to any non-transitory or transitory medium that provides or participates in providing instructions to a processor of the computing device (e.g., the BLE device 106*a-b*, the receiving server 105, or any other processor of a device described herein) for execution. Such a medium may take many forms, including but not limited to non-volatile media and volatile media. Nonvolatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A method comprising:

obtaining a data frame for transmission compliant with the wireless local area network communication protocol;

determining that the data frame includes a first preamble portion and a second preamble portion;

determining whether a transmission mode of the second preamble portion is beamforming in a same way as the first preamble portion or omni-directional based on a type of the wireless local area network communication protocol;

in response to determining that the transmission mode of the second preamble portion is beamforming in the same way as the first preamble portion:

transmitting the second preamble portion via beamforming.

2. The method of claim 1, wherein the transmitting the second preamble portion via beamforming comprises:

generating a beamforming matrix;

calculating each tone from a plurality of tones used to transmit the second preamble portion based on the beamforming matrix; and transmitting each calculated tone in accordance with the wireless local area network communication protocol.

3. The method of claim 1, wherein the second preamble portion includes a legacy portion and a high-efficiency (HE) portion, and wherein the HE portion includes a HE-SIGA field, and the method further comprises:

configuring a bit in the HE-SIGA field to indicate that the beamforming remains unchanged between the legacy portion and the HE portion.

4. The method of claim 1, further comprising:

when the transmission mode of the second preamble portion is omni-directional, transmitting the second preamble portion in omni-direction with no data transmission on guard tones that are configured in accordance with the wireless local area network communication protocol.

5. The method of claim 4, further comprising:

performing channel estimation using a first training field contained in the first preamble portion even if channel estimation has been performed based on a second training field contained in the second preamble portion.

6. The method of claim 1, further comprising:

filling guard tones in accordance with the wireless local area network communication protocol with extended symbols, and wherein the extended symbols are known symbols for a receiver to perform channel estimation.

7. The method of claim 1, further comprising:

applying at least one of cyclic delay diversity (CDD) and cyclic shift diversity (CSD) to the preamble.

8. The method of claim 7, wherein: when the CSD is applied in time domain to the second preamble portion, the same CSD is applied in time domain to the first preamble portion.

9. The method of claim 7, wherein: when the CDD is applied in frequency domain to the second preamble portion, the same or a different CDD is applied in frequency domain to the first preamble portion.

10. The method of claim 1, further comprising:

transmitting the second preamble portion via a mixed transmission mode of beamforming and omni-direction, wherein the mixed transmission mode is specified via a data value transmitted with the preamble, or implied by a transmission characteristic of the second preamble portion.

11. A system comprising:

processing circuitry configured to:

obtain a data frame for transmission compliant with the wireless local area network communication protocol, and determine that the data frame includes a first preamble portion and a second preamble portion; and wherein the processing circuitry is further configured to determine whether a transmission mode of the second preamble portion is beamforming in a same way as the first preamble portion or omni-directional based on a type of the wireless local area network communication protocol, and in response to determining that the transmission mode of the second preamble portion is beamforming in the same way as the first preamble portion, the wireless transmitter is further configured to transmit the second preamble portion via beamforming.

12. The system of claim 11, wherein the processing circuitry is further configured to:

generate a beamforming matrix, and calculate each tone from a plurality of tones used to transmit the second preamble portion based on the beamforming matrix; and wherein the wireless transmitter is configured to transmit each calculated tone in accordance with the wireless local area network communication protocol.

13. The system of claim 11, wherein the second preamble portion includes a legacy portion and a high-efficiency (HE) portion, and wherein the HE portion includes a HE-SIGA field, and the processing circuitry is further configured to:

designate a bit in the HE-SIGA field to indicate that the beamforming remains unchanged between the legacy portion and the HE portion.

14. The system of claim 11, wherein the wireless transmitter is further configured to:

when the transmission mode of the second preamble portion is omni-directional, transmit the second preamble portion in omni-direction with no data transmission on guard tones that are configured in accordance with the wireless local area network communication protocol.

15. The system of claim 14, wherein the processing circuitry is further configured to:

perform channel estimation using a first training field contained in the first preamble portion even if channel estimation has been performed based on a second training field contained in the second preamble portion.

16. The system of claim 11, wherein the processing circuitry is further configured to:

fill guard tones in accordance with the wireless local area network communication protocol with extended symbols, and wherein the extended symbols are known symbols for a receiver to perform channel estimation.

17. The system of claim 11, wherein the processing circuitry is further configured to:

apply at least one of cyclic delay diversity (CDD) and cyclic shift diversity (CSD) to the preamble.

18. The system of claim 17, wherein: when the CSD is applied in time domain to the second preamble portion, the same CSD is applied in time domain to the first preamble portion.

19. The system of claim 17, wherein: when the CDD is applied in frequency domain to the second preamble portion, the same or a different CDD is applied in frequency domain to the first preamble portion.

20. The system of claim 11, wherein the wireless transmitter is further configured to:

transmit the second preamble portion via a mixed transmission mode of beamforming and omni-direction, wherein the mixed transmission mode is specified via a data value transmitted with the preamble, or implied by a transmission characteristic of the second preamble portion.

* * * * *